US012789020B2

(12) United States Patent
Kaplan et al.

(10) Patent No.: US 12,789,020 B2
(45) Date of Patent: Nov. 10, 2026

(54) AIR/GAS SAMPLING APPARATUS FOR COMPRESSED AIR/GAS SOURCES

(71) Applicant: Industrial Technologies and Services, LLC, Davidson, NC (US)

(72) Inventors: Lawrence Kaplan, Miami Lakes, FL (US); Jammiaa Weadon, Miami Lakes, FL (US)

(73) Assignee: Industrial Technologies and Services, LLC, Davidson, NC (US)

(*) Notice: Subject to any disclaimer, the term of this patent is extended or adjusted under 35 U.S.C. 154(b) by 1063 days.

(21) Appl. No.: 17/869,924

(22) Filed: Jul. 21, 2022

(65) Prior Publication Data

US 2023/0024344 A1 Jan. 26, 2023

Related U.S. Application Data

(60) Provisional application No. 63/225,062, filed on Jul. 23, 2021.

(51) Int. Cl.
*A62B 9/02* (2006.01)
*A62B 9/04* (2006.01)

(52) U.S. Cl.
CPC ................ *A62B 9/022* (2013.01); *A62B 9/04* (2013.01)

(58) Field of Classification Search
CPC ........... A62B 9/04; A62B 9/022; A62B 27/00; B63C 11/22; B63C 2011/023; B63C 2011/2272
See application file for complete search history.

(56) References Cited

U.S. PATENT DOCUMENTS

| | | | | | |
|---|---|---|---|---|---|
| 4,014,216 | A * | 3/1977 | Thornton | G01N 1/2247 | 73/863.61 |
| 4,461,184 | A * | 7/1984 | Gandhi | G01N 1/2226 | 73/863.25 |
| 5,417,204 | A * | 5/1995 | Moesle, Jr. | G01N 21/783 | 422/86 |
| 5,437,199 | A * | 8/1995 | Kaplan | B63C 11/18 | 73/863.57 |
| 6,779,411 | B1 * | 8/2004 | Spurgeon | G01N 15/0272 | 73/863.23 |
| 9,188,509 | B2 * | 11/2015 | Mihaylov | G01N 1/00 | |
| 10,627,321 | B2 * | 4/2020 | Laughlin | G01N 1/2226 | |
| 2002/0029607 | A1 * | 3/2002 | Stephenson | G01N 1/2226 | 73/1.01 |

* cited by examiner

*Primary Examiner* — Valerie L Woodward
(74) *Attorney, Agent, or Firm* — Kevin E. West; Advent, LLP

(57) ABSTRACT

An air/gas sampling apparatus is used to retrieve, store, and ship an air/gas sample from a high-pressure air/gas source. The air/gas sampling apparatus includes a filter housing having a filter housing inlet segment and a filter housing outlet segment. The filter housing inlet segment has an inlet orifice and defines a flow restrictor passage and is removably connected to the filter housing outlet segment, defining a filter chamber at a flow restrictor passage outlet where the filter chamber holds a filter pad. As the entirety of the air/gas sample flows into the flow restrictor passage and through the filter pad to ensure the quality of the test of the air sample, the flow restrictor passage reduces the air/gas sample flowing to the filter chamber. The filtered air/gas sample is consequently delivered to and stored in a sample bag that may be shipped to a testing facility for analysis.

20 Claims, 6 Drawing Sheets

AIR/GAS SAMPLING APPARATUS FOR COMPRESSED AIR/GAS SOURCES

CROSS-REFERENCE TO RELATED APPLICATIONS

The present application claims priority under 35 U.S.C. § 119(e) of U.S. Provisional Application Ser. No. 63/225,062, filed Jul. 23, 2021, and titled "AIR/GAS SAMPLING APPARATUS FOR COMPRESSED AIR/GAS SOURCES." U.S. Provisional Application Ser. No. 63/225,062 is herein incorporated by reference in its entirety. Applicant's U.S. Pat. No. 5,437,199, filed Feb. 16, 1994, and titled "SAMPLING KIT FOR COMPRESSED AIR/GAS SOURCES" is herein incorporated by reference in its entirety.

BACKGROUND

Self-contained underwater breathing apparatus (SCUBA) tanks, also called diving cylinders, are used to store and transport high-pressure breathing air/gas during diving operations. Other types of self-contained breathing apparatus (SCBA) tanks, also known as compressed air breathing apparatus or oxygen tanks, are devices worn to provide breathable air in an atmosphere that may be dangerous for the user's health. SCBA tanks are typically used in the firefighting industry. Ambient air, compressed air, and other gases are used in various commercial and industrial applications, the composition and purity of which must be validated.

DRAWINGS

The Detailed Description is described with reference to the accompanying figures. The use of the same reference numbers in different instances in the description and the figures may indicate similar or identical items.

DETAILED DESCRIPTION

Figure 1A:
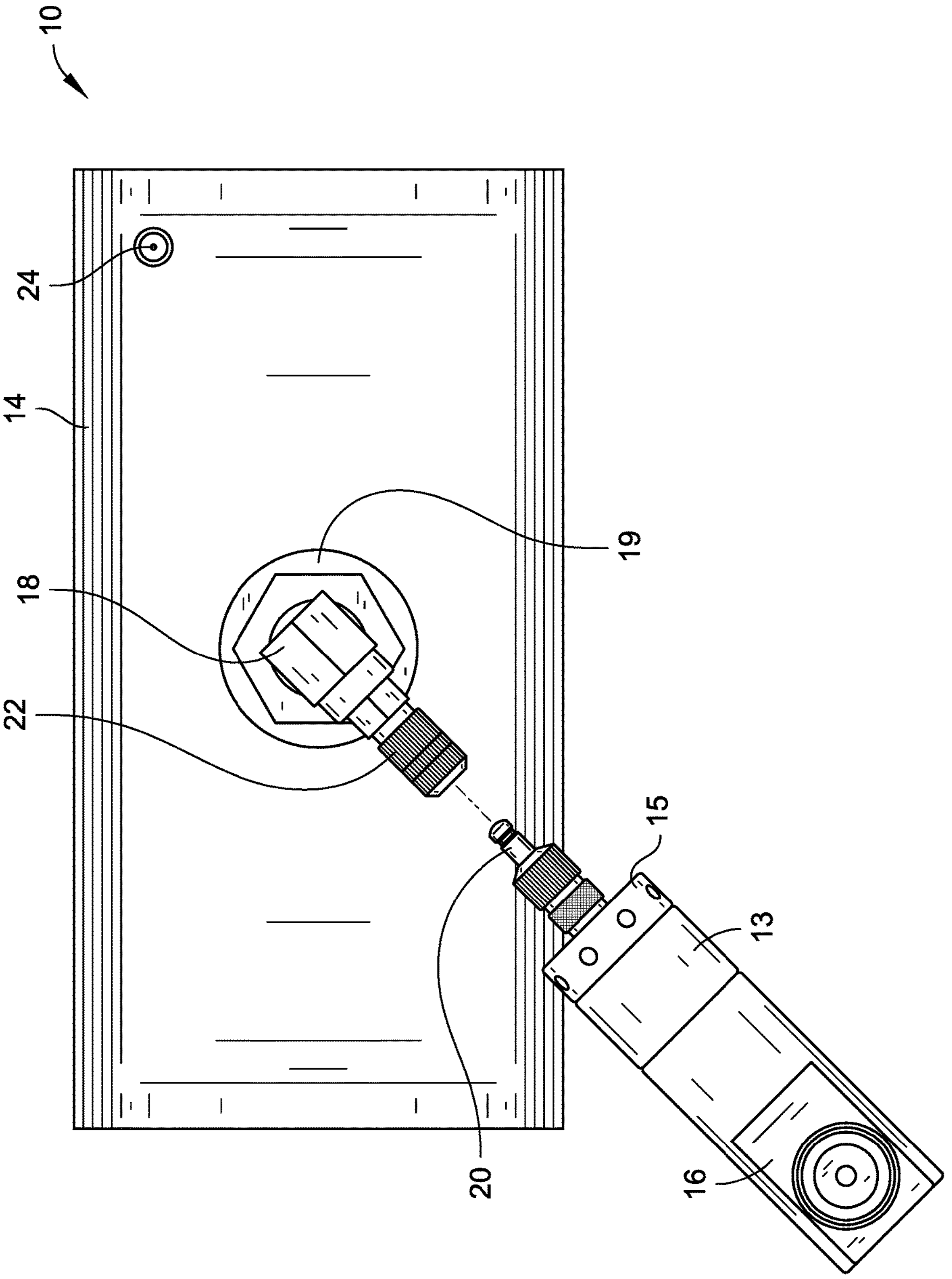
FIG. 1A shows a front view of an air/gas sampling apparatus having a filter housing connected to an air/gas source adapter and a sampling bag having an inlet fitting in accordance with example embodiments of the present application.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Overview

Scuba tanks, used for breathing underwater, maintain compressed breathing air at 3000 psi for use when diving. Since the compressed air is directly utilized and provides the only source of breathable air for the diver, the air source must be free of health threatening contaminants and must contain the proper mixture of nitrogen and oxygen to ensure safe breathing for the diver. Compressed air bottles and tanks are also used by firefighting personnel for a source of breathing air in smoke-filled areas. The air should be clean of contaminants and in the proper ratios of nitrogen and oxygen to ensure safe, healthy breathing air for firefighters. Air/gas used for commercial, industrial, or manufacturing purposes must be sampled and analyzed to determine their composition and guarantee their purity.

Scuba tanks and firefighting air tanks are periodically refilled from sources of air stored in large, high-pressure tanks, pressurized up to 7000 psi. The high-pressure source of air/gas is typically provided by commercial establishments for filling smaller air/gas tanks, scuba and firefighter tanks. In order to ensure that the air is of proper quality, commercial establishments periodically analyze air samples obtained from high-pressure storage tanks. This is done by collecting air/gas samples from each supply tank of high-pressure compressed air and sending the air/gas samples to outside laboratories for testing. The retrieved samples are stored in portable containers such as canisters suitable for the shipment to laboratory test sites. The canisters are often bulky and must undergo additional processing for safe shipping and handling that causes delays for timely test results.

The present invention provides an air/gas sampling apparatus for obtaining and retrieving representative quantified air/gas samples from high pressure air/gas storage tanks. The air/gas sampling apparatus has a filter housing comprising an inlet segment removably attached to an outlet segment. The filter housing inlet segment is attached directly to a high-pressure air/gas source adapter to an inlet fitting at a second end. The inlet fitting is in fluid communication with a sample bag. In order to ensure accurate testing results, the entirety, or one-hundred percent (100%) of the air/gas sample is directed through a filter pad housed within the filter housing that collects a representative sample of oil and other particles from the air/gas sample flow stream.

DETAILED DESCRIPTION OF EXAMPLE EMBODIMENTS

Generally referring to FIGS. 1A through 5, an air/gas sampling apparatus 10 is shown. The air/gas sampling apparatus 10 includes a filter housing 12 that includes a filter housing inlet segment 13 removably connected to a filter housing outlet segment 15. The filter housing inlet segment 13 has a first end 13A and a second end 13B, and the filter housing outlet segment 15 has a first end 15A and a second end 15B. The filter housing 12 is removably connected at the first end 13A of the filter housing inlet segment 13 to an air/gas source adapter 16. A quick release coupler 20 is attached to the second end 15B of the filter housing outlet segment 15.

Shown in FIG. 1A, the air/gas sampling apparatus 10 uses a sample bag 14 that includes an inlet fitting 18. Inlet fitting 18 may have an internal check valve and a relief valve (not shown). In example embodiments, the inlet fitting 18 is attached to the quick release coupler 22, which can be attached to the filter housing quick release coupler 20, when a sample is being collected. The inlet fitting 18, with the internal check valve, is connected to the sample bag 14 through a sealed flange 19. In this embodiment, a low pressure relief valve 24 is shown in one corner of the sample bag 14. In another embodiment, the low pressure relief valve 24 may be located within the inlet fitting 18.

The air/gas sample is retrieved and collected in the sample bag 14, which may be a portable, air impermeable container for ease in transport and delivery to a laboratory so that the sample contained therein can be tested to determine whether the quality of the sample is safe for breathing or for another application. The air/gas sample therein is maintained at a pressure below predetermined required limits. The sample bag 14 includes a sealed flange 19 on an exterior of the sample bag that connects it to the quick release coupler 22 and the inlet fitting 18. The inlet fitting 18 includes an internal check valve 19 so that the sample stored in the sample bag 14 cannot be released if the quick-release coupler 22 is disconnected from the sample bag 14. However, the sealed flange 19 can also provide a separate air connector conduit for laboratory instrumentation or for a vacuum pump (not shown). In example embodiments, the sample bag 14 is a foil membrane. In other embodiments, the sample bag 14 may be made of polyvinyl fluoride (PVF) polymer resins, polyvinylidene fluoride (PVFD), or a multilayer composition including but not limited to nylon, polyethylene, and aluminum foil. Other types of non-reactive thermoplastics may be used in the composition of the sample bag 14. After the analysis of the air/gas sample, the sample bag 14 may be replaced with a new sample bag 14 to ensure a new air/gas sample is not cross-contaminated.

Figure 1B:
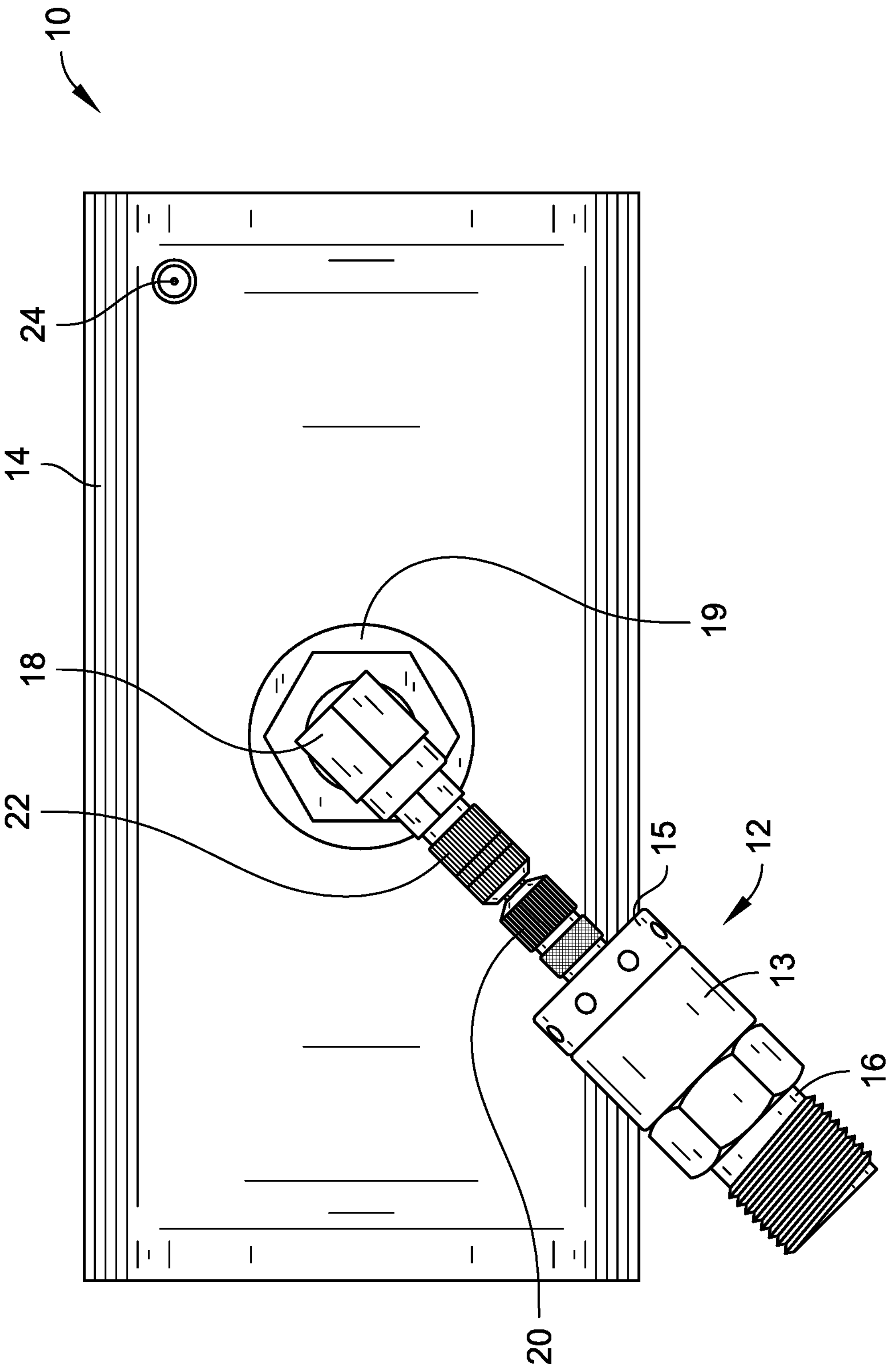
FIG. 1B shows a front view of the air/gas sampling apparatus of FIG. 1A, where the filter housing is connected to the sampling bag via the inlet fitting in accordance with example embodiments of the present disclosure.

Referring to FIG. 1B, the filter housing 12 is shown attached at the first end 13A of the filter housing inlet segment 13 to an air/gas source adapter 16 that can connect to a source of high-pressure air/gas for gathering a sample. The filter housing 12 is connected directly to the quick release coupler 20 that has been attached to the inlet fitting 18 of the sample bag 14 with the quick release coupler 22. The filter housing outlet segment 15 may include an outlet threaded connector 17 that can connect the filter housing 12 to the quick-release coupler 20. FIG. 1B also shows the air/gas sampling apparatus 10 that can be attached directly to a sample high-pressure air/gas or breathing air source (not shown) for collecting the sample of breathing air in the sample bag 14.

Figure 2:
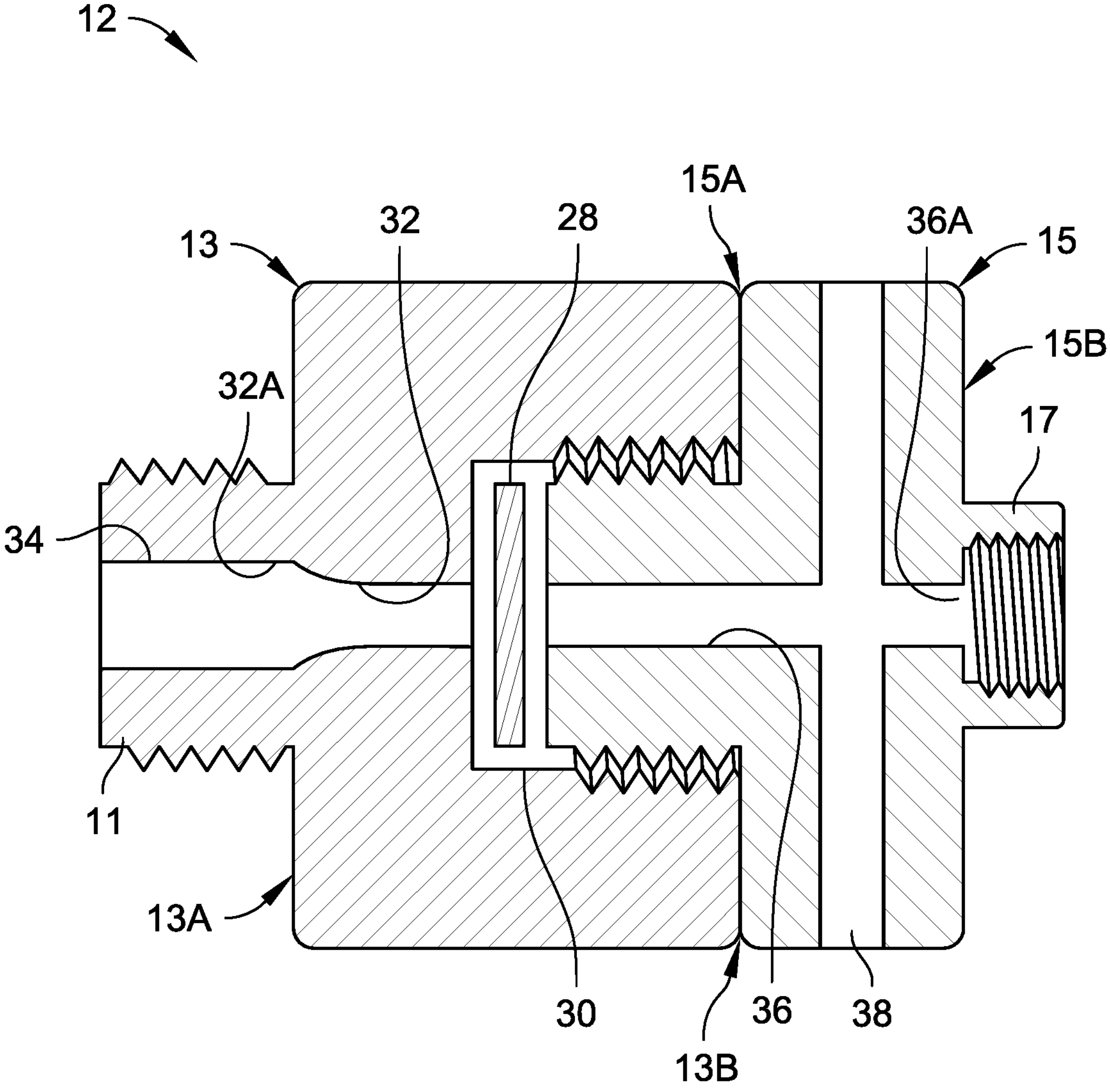
FIG. 2 shows a cross-sectional view of the filter housing including a filter housing inlet segment, a filter housing outlet segment, and a filter pad disposed between the filter housing inlet segment and the filter housing outlet segment in accordance with example embodiments of the present disclosure.

FIG. 2 shows a cross-sectional view of the filter housing 12 having the filter housing inlet segment 13 and the filter housing outlet segment 15 coupled together, the filter housing inlet segment 13 and the filter housing outlet segment 15 defining a filter chamber 30. A filter pad 28 is shown positioned within filter chamber 30. The filter pad 28 is configured to filter liquid and solid particles, such as oil and debris, from the air/gas sample flow stream entering the filter housing 12. The filter pad 28 can be inserted or removed, when the filter housing inlet segment 13 is disconnected from the filter housing outlet segment 15.

The filter housing inlet segment 13 includes an inlet threaded connector 11 at the first end 13A that connects the filter housing inlet segment 13 with the air/gas source adapter 16. The filter housing inlet segment 13 further defines an air passage 34 having a flow restrictor passage 32, leading to the filter chamber 30, to reduce the sample air/gas flow and the pressure going into the filter chamber 30, and ultimately, to the sample bag 14. The filter pad 28 is held in suspension downstream from the flow restrictor passage 32, capturing solid matter and oil/vapor droplets. The filter pad 28 may be later removed from the filter housing 12 at a testing laboratory and analyzed. In example embodiments, one-hundred percent (100%) of the air/gas sample retrieved from the high pressure air/gas sample source is directed through the filter pad 28, as required by most applicable testing standards, such as, for example, NFPA-1989 Standard on Breathing Air Quality for Emergency Services Respiratory Protection promulgated by the National Fire Protection Association (NFPA).

The air passage 34 directs the air/gas sample flow through a flow restrictor passage 32 having a critical orifice 32A and directly into the filter chamber 30 that houses the filter pad 28. The narrowing and reduction in cross-sectional area of the flow restrictor passage 32 reduces the incoming pressure of the air/gas sample from the high-pressure air source adapter (not shown in FIG. 3) to ensure that all (100%) of the incoming air/gas sample from the source, passes through the filter pad 28. Downstream of filter chamber 30, the air/gas sample, once filtered, continues to the filter housing outlet segment 15 through air passage 36. The critical orifice describes the minimum orifice area at which the mass flow rate of the air/gas flow depends on the pressure and temperature of the air/gas flow upstream from a choke point (e.g., the flow restrictor passage). For example, if the upstream pressure and temperature of the air/gas flow is fixed, the mass flow rate will remain constant. The dimension of the critical orifice 32A is proportional to a maximum inlet pressure supplied by the high-pressure air/gas source, where the air/gas sample source may have a pressure ranging from ambient pressure up to 7000 psi.

The filter housing outlet segment 15 may include a high-volume exhaust passage 38 extending radially from the air passage 36 of the filter housing outlet segment 15. As the air/gas sample passes through the air passage 36 the high-volume exhaust passage 38 reduces the volume of the air/gas sample that proceeds to outlet 36A at the outlet threaded connector 17, which receives the quick release coupler 20 for attaching the sample bag 14. The filter pad 28 may be examined, after transfer to a test laboratory, to confirm that all (100%) of the air/gas sample retrieved from the high-pressure air/gas source passed through the filter pad 28, depositing any oil droplets, vapor or particulates onto the filter pad 28, and ensuring the quality of the examination of the air/gas sample. In example embodiments, the filter housing outlet segment 15 includes at least one high-volume exhaust passage 38, and may include six (6) or more high-volume exhaust passages 38.

Figure 3:
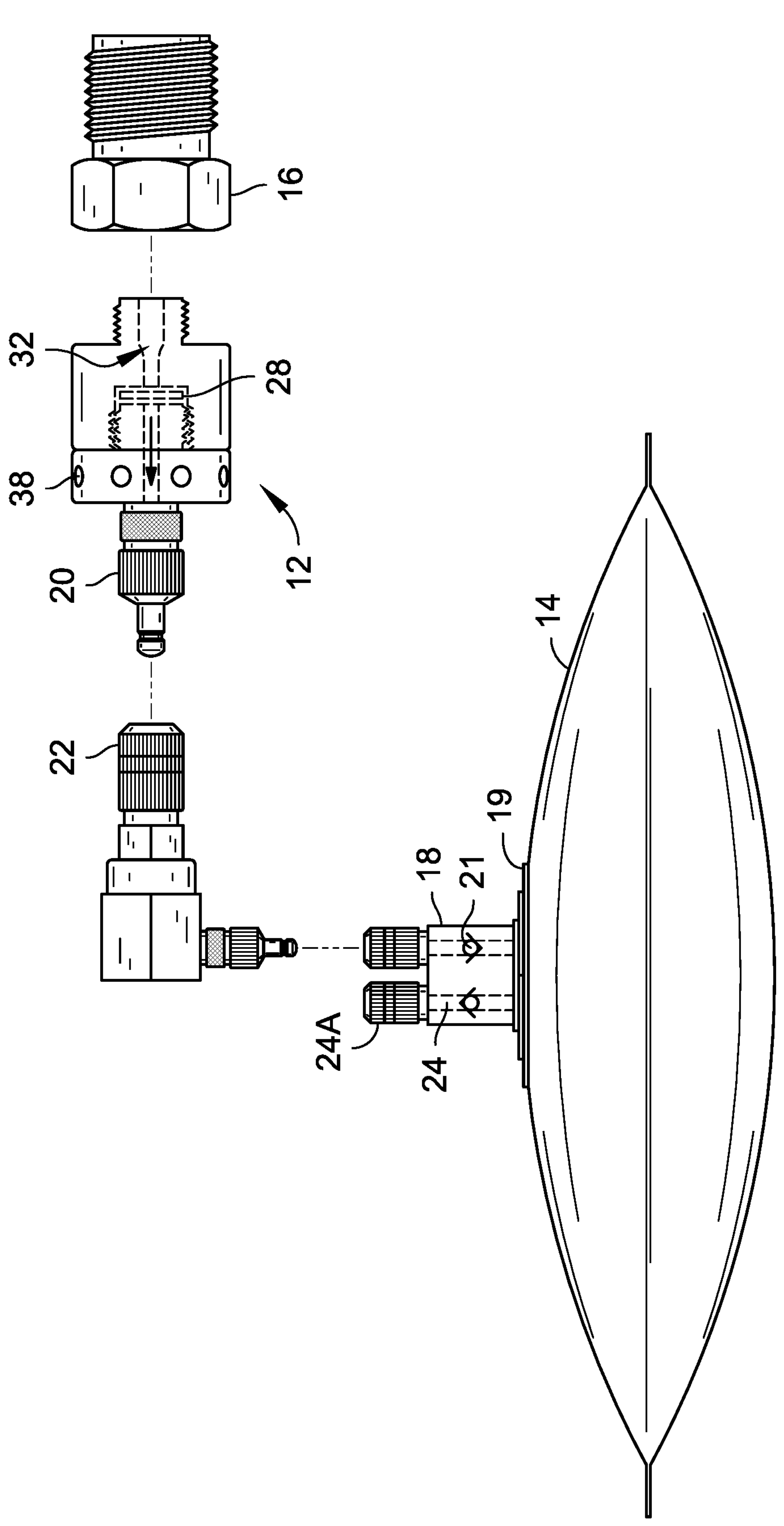
FIG. 3 shows a side view of the air/gas sampling apparatus having a sampling bag inlet fitting and a sampling bag relief valve in accordance with example embodiments of the present disclosure.

FIG. 3 shows an exploded view of the air/gas sampling apparatus 10. The filter pad 28 and filter housing 12 are fluidly connected to the flow restrictor passage 32, where the pressure of the air/gas sample received from the air/gas source adapter 16 is reduced. The air/gas source adapter 16 could also be a pressure system or a vacuum pump (not shown).

In example embodiments, the inlet fitting 18 leading into and sealed to the sample bag 14 includes an internal check valve 21 to prevent the air/gas sample from flowing out of the sample bag 14 when disconnected from the filter housing 12. Also shown is a low pressure relief valve 24 connected adjacent to the to the inlet fitting 18. The low pressure relief valve 24 is also in fluid communication with an additional connector 24A, for lab use into the instrument or a vacuum pump outside of the low pressure relief valve 24.

In example embodiments, the internal pressure of the air/gas sample inside the sample bag 14 is kept at a pressure permissible for transportation (e.g., via common carrier or air cargo), for example at a pressure equal to or below 10 psi. The sample bag 14 may hold sufficient air/gas for more than one (1) sample, where each individual sample is processed for analysis. In instances when a test run of the air/gas sample is unsuccessful, the sample bag 14 may still hold enough air/gas sample to run a second test run by using the remaining air/gas sample held therein. Holding more than one air/gas sample in the sample bag 14 may be useful for confirming the initial test results or for determining whether the instrumentation used for analyzing the sample (not shown) is functioning properly.

Figure 4:
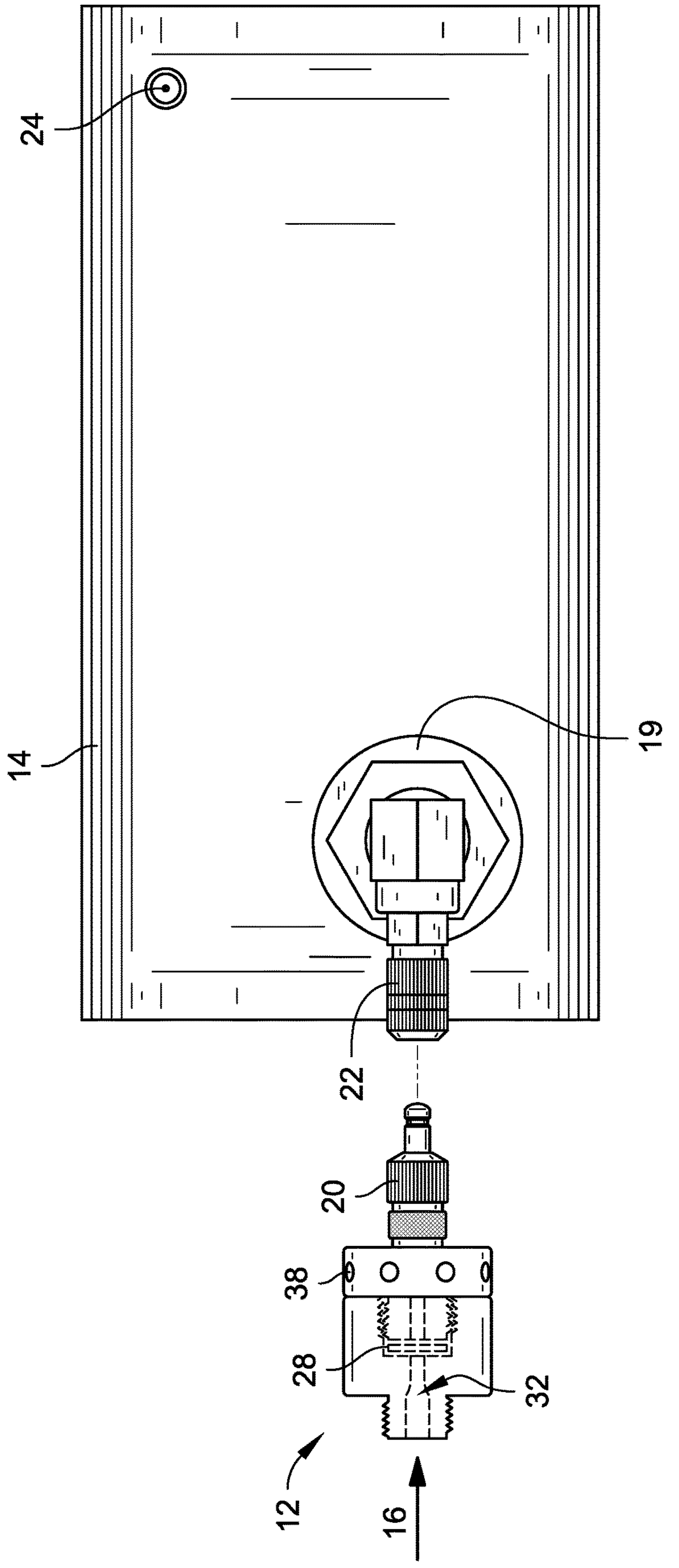
FIG. 4 shows a front view of an air/gas sampling apparatus having a filter housing and a sampling bag having an inlet fitting connected at a first corner and a low pressure relief valve at a second corner in accordance with example embodiments of the present application.

FIG. 4 shows another example embodiment where the sample bag has the low pressure relief valve 24 disposed in the upper right-hand corner and diagonally opposed to the inlet fitting 18 in the lower left-hand corner of the bag (as illustrated), and where the inlet fitting 18 includes a sealed flange 19 sealing the sample bag 14. This embodiment is not limiting, as the position of the low pressure relief valve 24 and the inlet fitting 18 may be rotated to the upper or lower and the right-hand or left-hand position along the surface area of the sample bag 14. The quick-release couplers 20 and 22 allow the filter housing 12 to be securely connected to the sample bag 14 for receiving the air/gas sample from the high-pressure air/gas source through the air/gas source adapter 16.

Figure 5:
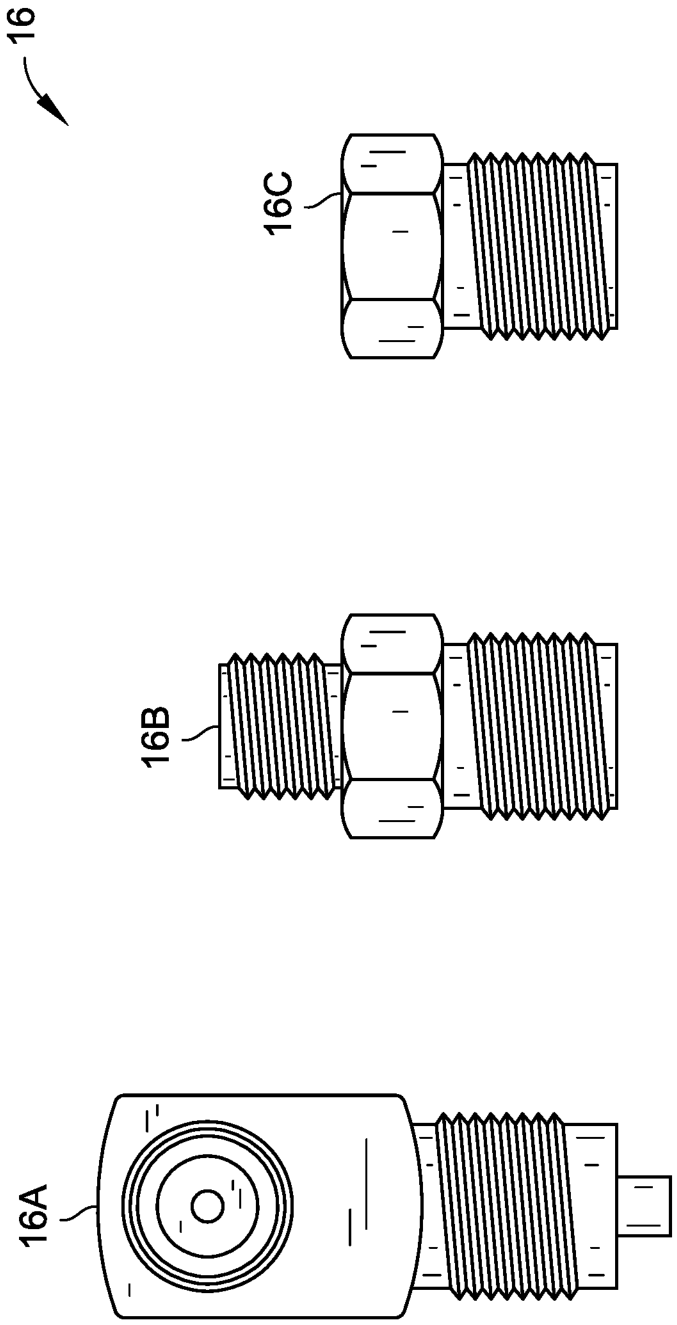
FIG. 5 shows different embodiments of air source adapters to connect the air/gas sampling apparatus to an air source in accordance with example embodiments of the present disclosure.

FIG. 5 depicts air/gas source adapters 16 for various high-pressure air/gas sources that can be directly connected to the filter housing threaded inlet opening so that all (100%) of the air/gas sample goes directly from the air/gas source adapter to the filter pad 28 of the filter housing 12. Shown are example high pressure air/gas source adapters 16, including, a self-contained underwater breathing apparatus (SCUBA) adapter 16A, a self-contained breathing apparatus (SCBA) adapter 16B, and a National Pipe Tapered (NPT) adapter 16C.

During use of the air/gas sampling apparatus 10, a supply source of high pressure breathing air (not shown) is selected. In example embodiments where the air/gas source is a SCUBA tank, a SCUBA tank adapter 16A is connected to the inlet filter housing segment 13 and to the SCUBA tank supply yoke. The SCUBA tank adapter 16A may be connected to the filter housing by a threaded coupling as shown in the example embodiments. The SCUBA tank supply source is turned ON, allowing the air/gas sample to flow into the ai/gas sampling apparatus 10 and ultimately into the sample bag 14. After a predetermined amount of time, for example between one (1) to five (5) minutes, a sufficient air/gas sample is collected in the sample bag 14, the supply source is turned OFF. The duration of the air/gas sampling may last between five minutes to The SCUBA tank adapter 16A is removed from the inlet threaded connector 11 of the filter housing 12. The filter housing outlet segment 15 may also be disconnected from the quick-release coupler 20 and/or 22, disconnecting the filter housing 12 from the sample bag 14. The sample bag is then shipped to a test facility (not shown).

While the subject matter has been illustrated and described in detail in the drawings and foregoing description, the same is to be considered as illustrative and not restrictive in character, it being understood that only example embodiments have been shown and described and that all changes and modifications that come within the spirit of the subject matters are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An air/gas sampling apparatus to retrieve, store, and ship an air/gas sample from a high-pressure air/gas source comprising:
- a filter housing including:
- a filter housing inlet segment including an inlet orifice and defining a flow restrictor passage, the flow restrictor passage narrowing between an inlet side of the inlet orifice and an outlet side of the inlet orifice;
- a filter housing outlet segment including a central outlet passage and removably connected to the filter housing inlet segment, the filter housing inlet segment and the filter housing outlet segment defining a filter chamber at the outlet side of the inlet orifice, the filter chamber having a chamber inlet and a chamber outlet, and
- a filter pad disposed in the filter chamber, whereby the entirety of the air/gas sample flows into the flow restrictor passage and through the filter pad to ensure the quality of the test of the air sample, the flow restrictor passage reducing the air/gas sample flow to the filter chamber; and
- a sample bag for receiving and storing the air/gas sample from the chamber outlet.

2. The air/gas sampling apparatus of claim 1, wherein the sample bag includes an inlet fitting with an internal check valve, the inlet fitting in fluid communication with the filter housing.

3. The air/gas sampling apparatus of claim 2, further including a quick release coupler attached between the filter housing outlet segment and the inlet fitting.

4. The air/gas sampling apparatus of claim 1, wherein the filter housing outlet segment includes at least one high-volume exhaust passage downstream of the filter chamber.

5. The air/gas sampling apparatus of claim 4, wherein the at least one high-volume exhaust outlet section is coupled to the sample bag.

6. The air/gas sampling apparatus of claim 1, wherein the sampling apparatus further includes a low-pressure relief valve configured to exhaust excess air/gas stored in the sample bag.

7. The air/gas sampling apparatus of claim 1, wherein the filter housing inlet segment is directly connected to a high-pressure air/gas source adapter.

8. The air/gas sampling apparatus of claim 7, wherein the high-pressure air/gas source adapter is one of a self-contained underwater breathing apparatus (SCUBA) adapter, a self-contained breathing apparatus (SCBA) adapter, or a National Pipe Tapered (NPT) adapter.

9. The air/gas sampling apparatus of claim 1, wherein the filter housing inlet segment and the filter housing outlet segment are threadedly coupled to one another.

10. An air/gas sampling apparatus to retrieve, store, and ship an air/gas sample from a high-pressure air/gas source comprising:

a filter housing including:

a filter housing inlet segment including an inlet orifice and defining a flow restrictor passage, the flow restrictor passage narrowing between an inlet side of the inlet orifice and an outlet side of the inlet orifice;

a filter housing outlet segment including a central outlet passage and removably connected to the filter housing inlet segment, the filter housing inlet segment and the filter housing outlet segment defining a filter chamber at the outlet side of the inlet orifice, the filter chamber having a chamber inlet and a chamber outlet, and a filter pad disposed in the filter chamber, whereby the entirety of the air/gas sample flows into the flow restrictor passage and through the filter pad to ensure the quality of the test of the air sample, the flow restrictor passage reducing the air/gas sample flow to the filter chamber; and a sample bag for receiving and storing the air/gas sample from the chamber outlet, the sample bag including an inlet fitting with an internal check valve, the inlet fitting in fluid communication with the filter housing.

11. The air/gas sampling apparatus of claim 10, wherein the filter housing outlet segment includes at least one high-volume exhaust passage downstream of the filter chamber.

12. The air/gas sampling apparatus of claim 11, wherein the at least one high-volume exhaust outlet section is coupled to the sample bag.

13. The air/gas sampling apparatus of claim 10, further including a quick release coupler attached between the filter housing outlet segment and the inlet fitting.

14. The air/gas sampling apparatus of claim 10, wherein the sample bag further includes a low-pressure relief valve configured to exhaust excess air/gas sample stored in the sample bag.

15. The air/gas sampling apparatus of claim 10, wherein the filter housing inlet segment is directly connected to a high-pressure air/gas source adapter.

16. The air/gas sampling apparatus of claim 15, wherein the high-pressure air/gas source adapter is one of a self-contained underwater breathing apparatus (SCUBA) adapter, a self-contained breathing apparatus (SCBA) adapter, or a National Pipe Tapered (NPT) adapter.

17. An air/gas sampling apparatus to retrieve, store, and ship an air/gas sample from a high-pressure air/gas source comprising:

a filter housing including:

a filter housing inlet segment including an inlet orifice and defining a flow restrictor passage, the flow restrictor passage narrowing between an inlet side of the inlet orifice and an outlet side of the inlet orifice;

a filter housing outlet segment including a central outlet passage and removably connected to the filter housing inlet segment, the filter housing inlet segment and the filter housing outlet segment defining a filter chamber at the outlet side of the inlet orifice, the filter chamber having a chamber inlet and a chamber outlet, and a filter pad disposed in the filter chamber, whereby the entirety of the air/gas sample flows into the flow restrictor passage and through the filter pad to ensure the quality of the test of the air sample, the flow restrictor passage reducing the air/gas sample flow to the filter chamber;

and a sample bag for receiving and storing the air/gas sample from the chamber outlet, the sample bag including an inlet fitting with an internal check valve, the inlet fitting in fluid communication with the filter housing, and having a quick release coupler attached between the filter housing outlet segment and the inlet fitting.

18. The air/gas sampling apparatus of claim 17, wherein the filter housing outlet segment includes at least one high-volume exhaust passage downstream of the filter chamber.

19. The air/gas sampling apparatus of claim 17, wherein the filter housing inlet segment is directly connected to a high-pressure air/gas source adapter.

20. The air/gas sampling apparatus of claim 19, wherein the high-pressure air/gas source adapter is one of a self-contained underwater breathing apparatus (SCUBA) adapter, a self-contained breathing apparatus (SCBA) adapter, or a National Pipe Tapered (NPT) adapter.

* * * * *